(12) United States Patent
Nakamura et al.

(10) Patent No.: US 7,884,812 B2
(45) Date of Patent: Feb. 8, 2011

(54) LIQUID CRYSTAL PROJECTOR

(75) Inventors: Hisashi Nakamura, Hyogo (JP);
Tomohiko Fujii, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 339 days.

(21) Appl. No.: 10/644,068

(22) Filed: Aug. 20, 2003

(65) Prior Publication Data

US 2004/0119945 A1    Jun. 24, 2004

(30) Foreign Application Priority Data

Aug. 21, 2002    (JP) .............................. 2002-240436

(51) Int. Cl.
*G09G 5/00* (2006.01)
*G06F 3/038* (2006.01)
(52) U.S. Cl. ....................... 345/204; 713/182; 713/183; 713/184
(58) Field of Classification Search ......... 713/182–184; 345/204
See application file for complete search history.

(56) References Cited

U.S. PATENT DOCUMENTS

| 5,465,083 | A * | 11/1995 | Okamoto .................. 340/5.54 |
| 5,841,466 | A * | 11/1998 | Mizoguchi et al. ............ 725/30 |
| 2001/0021979 | A1* | 9/2001 | Ito .............................. 713/189 |
| 2002/0008692 | A1 | 1/2002 | Omura et al. |
| 2002/0058536 | A1 | 5/2002 | Horii et al. |
| 2003/0199267 | A1 | 10/2003 | Iwasa et al. |

FOREIGN PATENT DOCUMENTS

| CA | 2329311 A1 | 10/1999 |
| JP | 07-306730 | 11/1995 |
| JP | 07-306730 A | 11/1995 |
| JP | 10-111728 | 4/1998 |
| JP | 10-207777 | 8/1998 |
| JP | 10-207777 A | 8/1998 |
| JP | 11-119326 | 4/1999 |
| JP | 11-305865 | 11/1999 |
| JP | 2000-003338 | 1/2000 |
| JP | 2000-043384 | 2/2000 |
| JP | 2000-043484 | 2/2000 |
| JP | 2000-043484 A | 2/2000 |
| JP | 2000-222123 | 8/2000 |
| JP | 2000-222123 A | 8/2000 |
| JP | 2001-027911 | 1/2001 |

(Continued)

OTHER PUBLICATIONS

JP 2002-240436 Office Action mailed Feb. 8, 2006.

(Continued)

*Primary Examiner*—Ke Xiao
(74) *Attorney, Agent, or Firm*—Westerman, Hattori, Daniels & Adrian, LLP

(57) ABSTRACT

Disclosed is a liquid crystal projector comprising operation means for operating a liquid crystal projector; means for previously registering a password; means for entering, in a case where the password is registered, a password when the power to the liquid crystal projector is turned on; and means for comparing the entered password with the registered password and making it possible to operate the liquid crystal projector by the operation means only when both the passwords coincide with each other.

2 Claims, 4 Drawing Sheets

FOREIGN PATENT DOCUMENTS

| | | |
|---|---|---|
| JP | 2001-067051 | 3/2001 |
| JP | 2001-067051 A | 3/2001 |
| JP | 2002-041469 | 2/2002 |
| JP | 2002-041469 A | 2/2002 |
| JP | 2002-512409 | 4/2002 |
| JP | 2002-512409 A | 4/2002 |
| JP | 2002-152696 | 5/2002 |
| JP | 2002-152696 A | 5/2002 |
| JP | 2002-229608 | 8/2002 |
| JP | 2002-229739 | 8/2002 |
| JP | 2002-229739 A | 8/2002 |
| WO | WO 99/54851 | 10/1999 |
| WO | WO 99/54851 A1 | 10/1999 |
| WO | WO 02/42890 A1 | 5/2002 |

OTHER PUBLICATIONS

JP 2002-240436 Office Action mailed Dec. 7, 2005.
Japanese Office Action dated Sep. 19, 2006, Application No. 2006-025175.
Japanese Office Action dated Dec. 5, 2006, Application No. 2006-025175.

* cited by examiner

LIQUID CRYSTAL PROJECTOR

BACKGROUND OF THE INVENTION

1. Field of the Invention

The present invention relates to a liquid crystal projector.

2. Description of the Prior Art

In recent years, liquid crystal projectors have spread in general homes and offices. However, the conventional liquid crystal projector has no function of restricting improper use because there occurs a state where anybody can use the liquid crystal projector if a system is powered on by operating a power supply key. Therefore, the liquid crystal projector has been frequently stolen and improperly used.

SUMMARY OF THE INVENTION

An object of the present invention is to provide a liquid crystal projector capable of preventing improper use.

A first liquid crystal projector according to the present invention is characterized by comprising operation means for operating a liquid crystal projector; means for previously registering a password; means for entering, in a case where the password is registered, a password when the power to the liquid crystal projector is turned on; and means for comparing the entered password with the registered password and making it possible to operate the liquid crystal projector by the operation means only when both the passwords coincide with each other.

A second liquid crystal projector according to the present invention is characterized by comprising an operation unit for operating a liquid crystal projector; a circuit for previously registering a password; a circuit for entering, in a case where the password is registered, a password when the power to the liquid crystal projector is turned on; and a circuit for comparing the entered password with the registered password and making it possible to operate the liquid crystal projector by the operation unit only when both the passwords coincide with each other.

In a liquid crystal projector operated by an external computer connected to the liquid crystal projector by radio or wire and carrying liquid crystal projector controlling software for controlling the liquid crystal projector, a third liquid crystal projector according to the present invention is characterized by comprising operation means for operating the liquid crystal projector; means for previously registering a password in the liquid crystal projector; means for inhibiting, in a case where the password is registered in the liquid crystal projector, the operation of the liquid crystal projector by the operation means as well as waiting until a password is sent from the external computer when the power to the liquid crystal projector is turned on; and means for comparing, when the password is sent from the external computer, the sent password with the registered password and making it possible to operate the liquid crystal projector by the external computer only when both the passwords coincide with each other.

In a liquid crystal projector operated by an external computer connected to the liquid crystal projector by radio or wire and carrying liquid crystal projector controlling software for controlling the liquid crystal projector, a fourth liquid crystal projector according to the present invention is characterized by comprising an operation unit for operating the liquid crystal projector; a circuit for previously registering a password in the liquid crystal projector; a circuit for inhibiting, in a case where the password is registered in the liquid crystal projector, the operation of the liquid crystal projector by the operation unit as well as waiting until a password is sent from the external computer when the power to the liquid crystal projector is turned on; and a circuit for comparing, when the password is sent from the external computer, the sent password with the registered password and making it possible to operate the liquid crystal projector by the external computer only when both the passwords coincide with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a flow chart showing the operations of a microcomputer 20 in a case where the power to the liquid crystal projector is turned on;

FIG. 4 is a flow chart showing the operations of a microcomputer 20 and a PC 100 in a case where the power to the liquid crystal projector is turned on.

DESCRIPTION OF THE PREFERRED EMBODIMENTS

Figure 1:
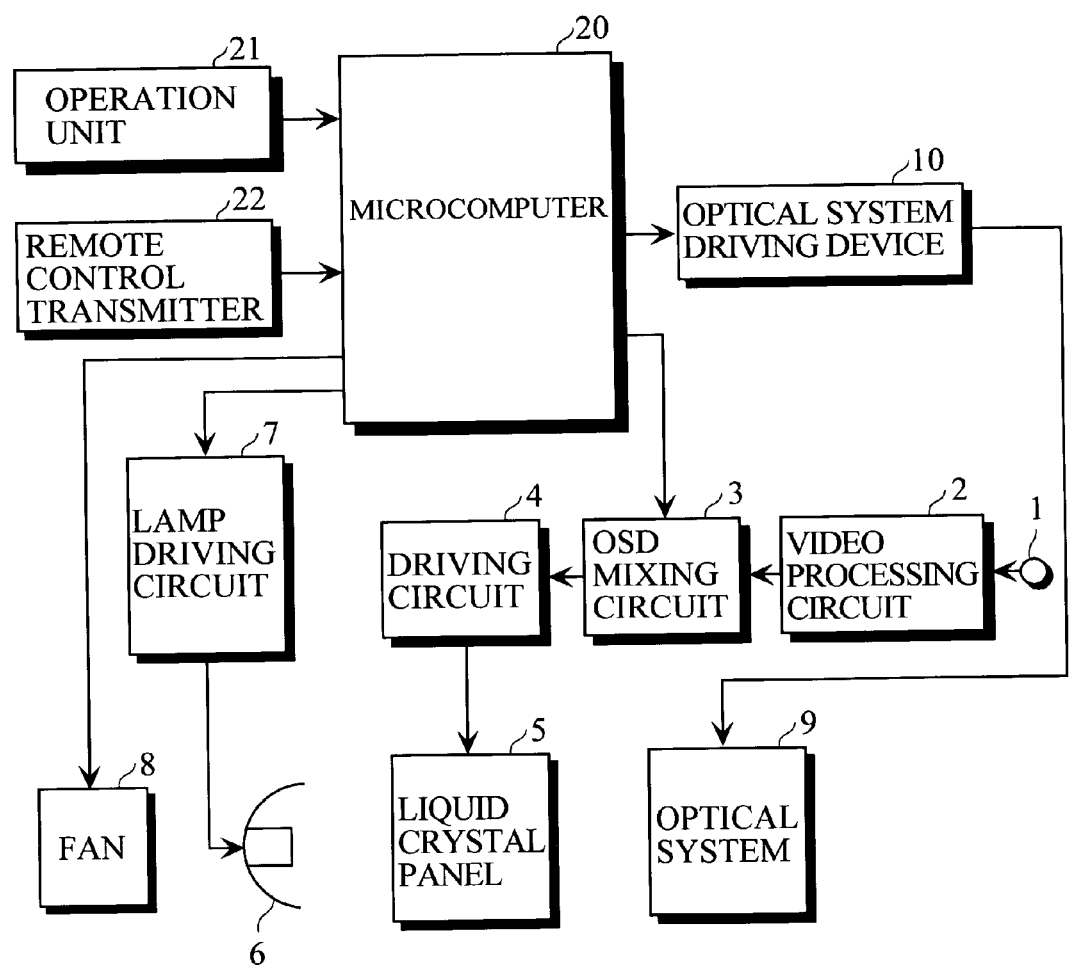
FIG. 1 is a block diagram showing the configuration of a liquid crystal projector according to a first embodiment of the present invention.

Referring now to the drawings, embodiments of the present invention will be described.

[1] Description of First Embodiment

FIG. 1 illustrates the configuration of a liquid crystal projector.

A video signal inputted to a video input terminal 1 is fed to a video processing circuit 2, and is subjected to scaling processing or the like. The video signal outputted from the video processing circuit 2 is fed to an OSD mixing circuit 3, and is synthesized with OSD (On-Screen Display) data. The video signal outputted from the OSD mixing circuit 3 is written into a liquid crystal panel 5 by a driving circuit 4.

The video written into the liquid crystal panel 5 is projected on a screen (not shown) through an optical system 9 by the function of a light source lamp 6. A cooling fan 8 is provided in the vicinity of the light source lamp 6.

The light source lamp 6 is driven by a lamp driving circuit 7. The optical system 9 includes an optical system adjusting mechanism for making zoom adjustment, focus adjustment, and shift adjustment. An optical system driving device 10 is for driving the optical system adjusting mechanism to make zoom adjustment, focus adjustment, and shift adjustment, and comprises a zooming motor, a focusing motor, and a shifting motor.

The lamp driving circuit 7, the cooling fan 8, and the optical system driving device 10 are controlled by a microcomputer 20. To the microcomputer 20, an operation signal is inputted from an operation unit 21 provided in the main body of the liquid crystal projector, and a remote operation signal is inputted from a remote control transmitter 22.

The liquid crystal projector according to the present embodiment comprises the function of causing a user to set a log-in password. That is, a menu screen (on-screen) is displayed by operating the operation unit 21 or the remote control transmitter 22 to turn the power to the liquid crystal projector on and then, operating a menu key on the operation unit 21 or the remote control transmitter 22. A password setting item is selected from the menu screen, thereby displaying a password setting screen (on-screen) to set a password. When the password is set in such a way, a key operation performed by the operation unit 21 or the remote control transmitter 22 is nullified unless a normal password is entered by the operation unit 21 or the remote control transmitter 22 from the next time when the power is turned on, thereby preventing improper use.

Figure 2:
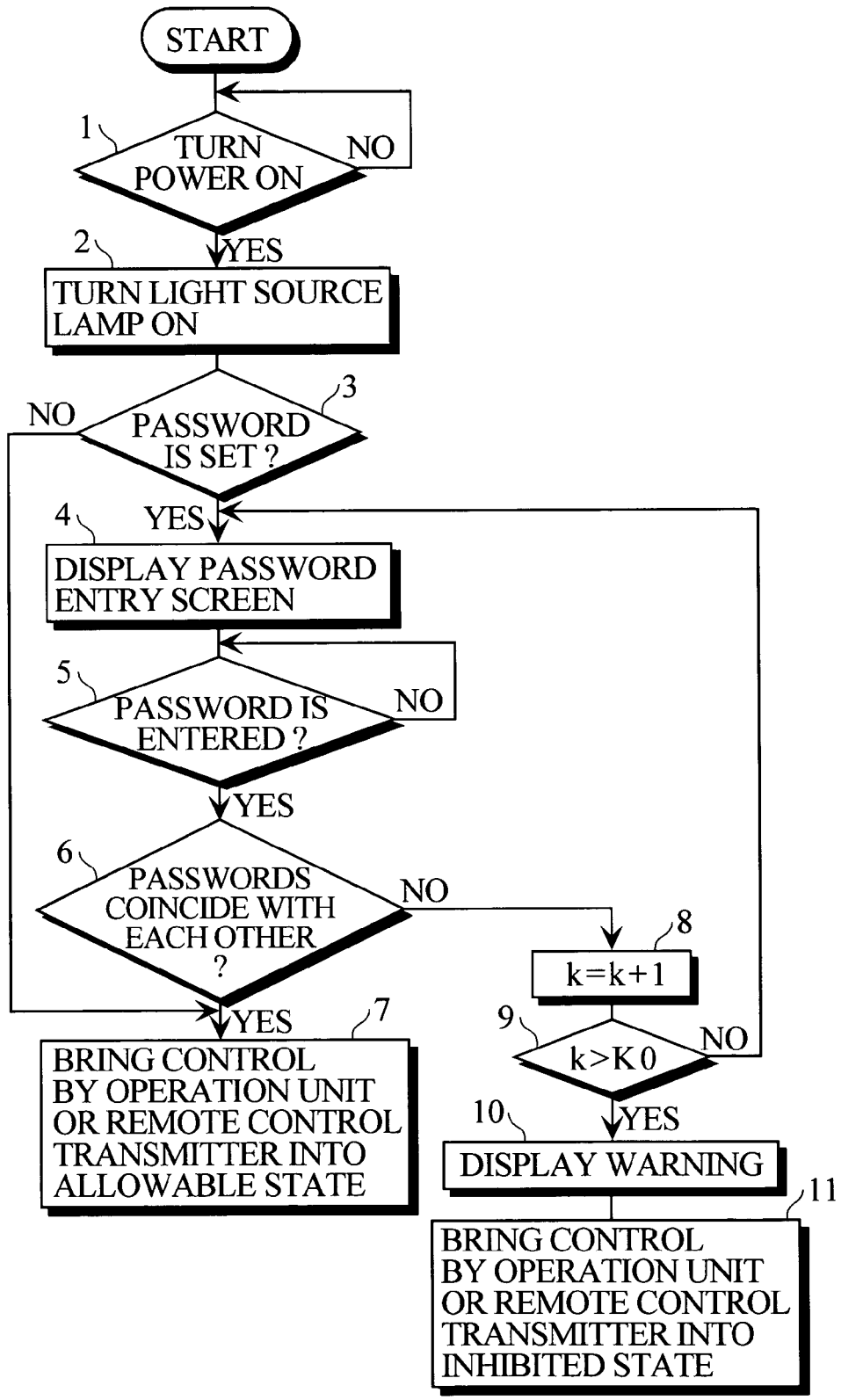

FIG. 2 shows the operations of the microcomputer 20 in a case where the power to the liquid crystal projector is turned on.

When the operation unit 21 or the remote control transmitter 22 is operated so that the power to the liquid crystal projector is turned on (step 1), the light source lamp 6 is turned on (step 2). It is judged whether or not a password is set (step 3). When the password is not set, the control of the liquid crystal projector by the operation unit 21 or the remote control transmitter 22 is brought into an allowable state (step 7). That is, the subsequent key entry made by the operation unit 21 or the remote control transmitter 22 is treated as valid one.

When the password is set, a password entry screen is displayed (step 4), to wait until a password is entered. When the password is entered (step 5), the password entry screen is erased, and it is judged whether or not the entered password coincides with the password already registered (step 6).

When both the passwords coincide with each other, the control of the liquid crystal projector by the operation unit 21 or the remote control transmitter 22 is brought into an allowable state (step 7). That is, the subsequent key entry made by the operation unit 21 or the remote control transmitter 22 is treated as valid one.

When the entered password does not coincide with the password already registered, a variable k (its initial value is zero) for storing the number of times of entry of an erroneous password is incremented by one (step 8). It is judged whether or not the variable k exceeds an allowable number of times K0 previously determined (step 9). When the variable k is not more than the allowable number of times K0 previously determined, the program is returned to the step 4. In the step 4, the password entry screen is displayed again, to force a password to be reentered.

When it is judged in the foregoing step 9 that the variable k exceeds the allowable number of times K0 previously determined, a warning indicating "the password cannot be used because it does not coincide with the registered password" is displayed (step 10), and the control of the liquid crystal projector by the operation unit 21 or the remote control transmitter 22 is brought into an inhibited state (step 11). That is, the subsequent key entry made by the operation unit 21 or the remote control transmitter 22 is nullified. However, a power-off command issued by a power key operation is made valid.

In a case where the password is set, a predetermined item is selected from the menu screen, thereby making it also possible to change the password and release the setting of the password.

According to the above-mentioned first embodiment, when the password is set in the liquid crystal projector, the liquid crystal projector cannot be controlled (operated) unless a normal password is entered from the operation unit 21 of the liquid crystal projector or the remote control transmitter 22 after the power to the liquid crystal projector is turned on, thereby preventing improper use.

[2] Description of Second Embodiment

Figure 3:
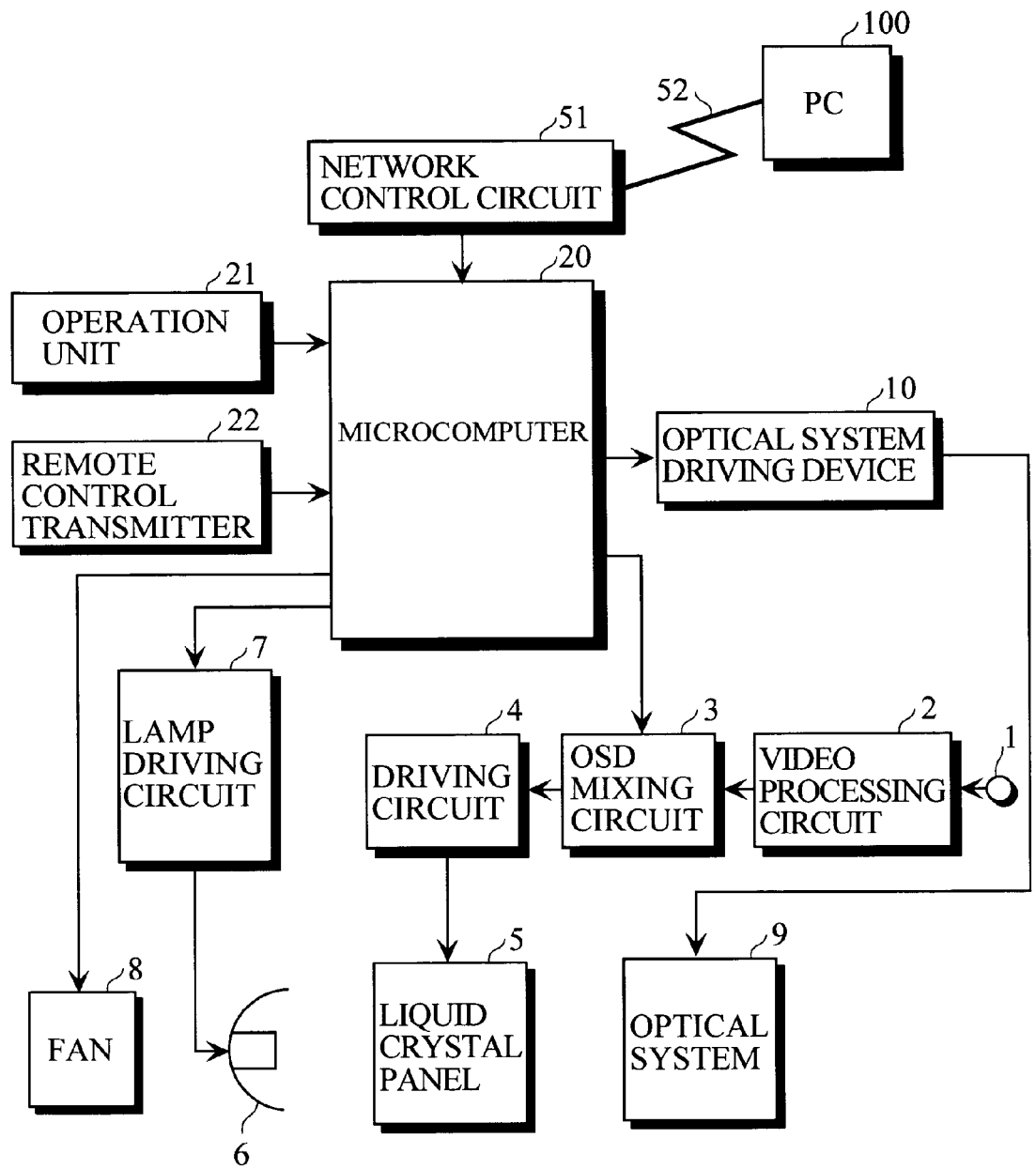
FIG. 3 is a block diagram showing the configuration of a liquid crystal projector according to a second embodiment of the present invention.

FIG. 3 illustrates the configuration of a liquid crystal projector. In FIG. 3, the same units as those shown in FIG. 1 are assigned the same reference numerals and hence, the description thereof is not repeated.

The configuration itself of the liquid crystal projector is the same as that in the first embodiment. In the second embodiment, a microcomputer 20 in the liquid crystal projector is connected to a PC 100 capable of controlling the liquid crystal projector through a network control circuit 51 and a network 52 such as a LAN (Local Area Network) or a wireless LAN.

Liquid crystal projector controlling software (a liquid crystal projector controlling program) is installed in the PC 100.

The liquid crystal projector according to the present embodiment comprises the function of causing a user to set a log-in password, as in the first embodiment. That is, a menu screen (on-screen) is displayed by operating an operation unit 21 or a remote control transmitter 22 to turn the power to the liquid crystal projector on and then, operating a menu key on the operation unit 21 or the remote control transmitter 22. A password setting item is selected from the menu screen, thereby displaying a password setting screen (on-screen) to set a password.

When the password is set in the liquid crystal projector in such a way, a key operation performed by the operation unit 21 or the remote control transmitter 22 is nullified from the next time when the power to the liquid crystal projector is turned on. In a case where a normal password is entered from the PC 100 at the next time when the power is turned on, it is possible to carry out the control (operation) of the liquid crystal projector by the PC 100.

When the user sets the password in the liquid crystal projector, the liquid crystal projector controlling software is started in the PC 100, to perform such setting that a password entry screen is displayed on a monitor of the PC 100 from the next time when the liquid crystal projector controlling software is standard (setting of a log-in mode using the password).

In a system as shown in FIG. 3, after the power to the liquid crystal projector is turned on by operating the operation unit 21 or the remote control transmitter 22, the liquid crystal projector controlling software is generally started in the PC 100. When the liquid crystal projector controlling software is started in the PC 100 before the power to the liquid crystal projector is turned on, such a screen as to request the user to turn the power to the liquid crystal projector on is displayed on the monitor of the PC 100 by the liquid crystal projector controlling software.

Figure 4:
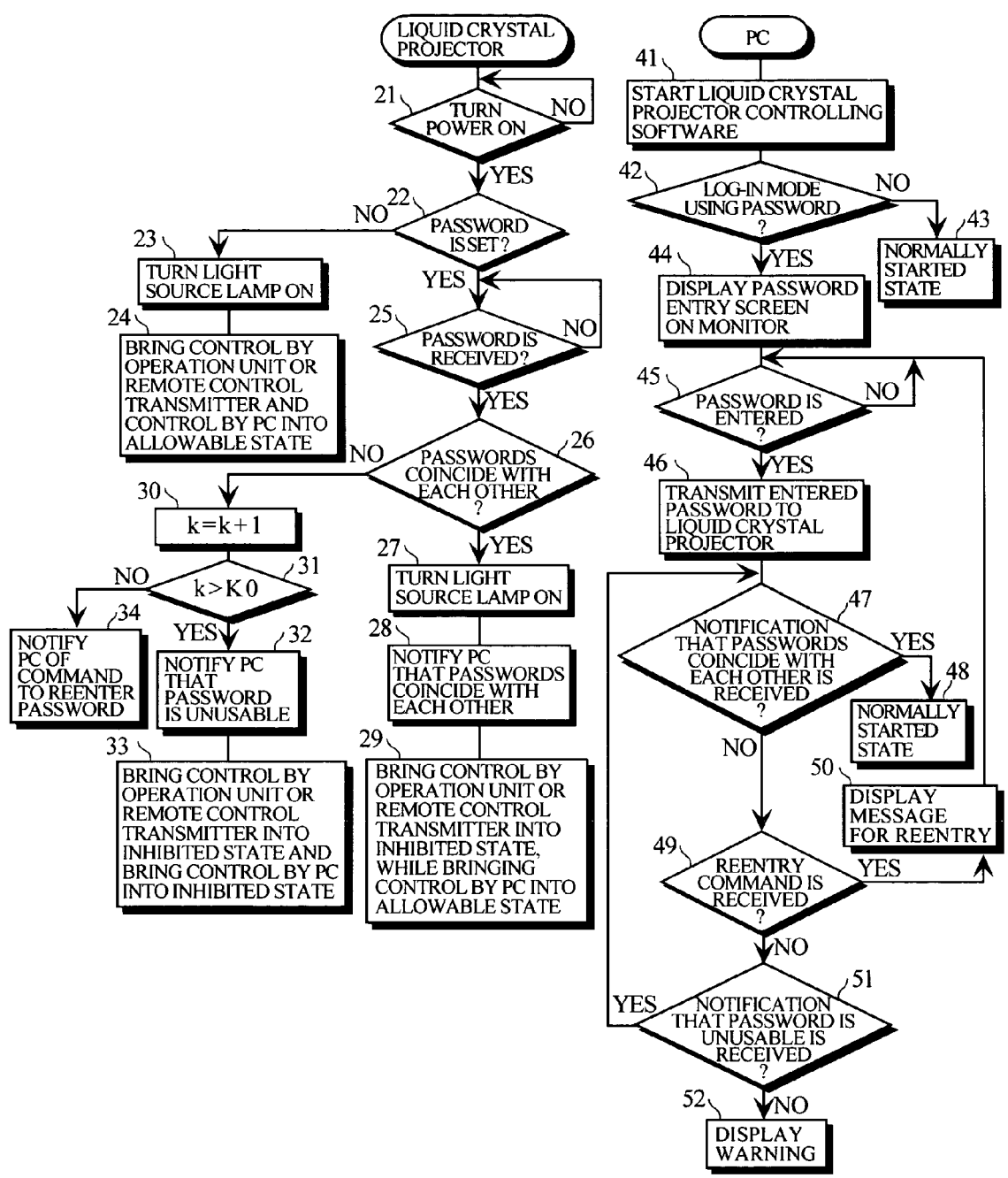

FIG. 4 shows the operations of the microcomputer 20 and the PC 100 in a case where the power to the liquid crystal projector is turned on.

When the operation unit 21 or the remote control transmitter 22 is operated so that the power to the liquid crystal projector is turned on (step 21), it is judged whether or not a password is set (step 22). When the password is not set, a light source lamp 6 is turned on (step 23), and the control of the liquid crystal projector by the operation unit 21 or the remote control transmitter 22 and the control of the liquid crystal projector by the PC 100 are then brought into an allowable state (step 24). When the password is set, the microcomputer 20 enters a state where it waits for the receiving of the password from the PC 100 (step 25).

On the other hand, in the PC 100, when the liquid crystal projector controlling software is started (step 41) after the power to the liquid crystal projector is turned on, it is judged whether or not a log-in mode using the password is set (step 42). When the log-in mode using the password is not set, the liquid crystal projector controlling software enters a normally started state without displaying the password entry screen (step 43). When the log-in mode using the password is set, the PC 100 displays the password entry screen on the monitor of the PC 100.

When the user operates the PC 100 to enter the password on the password entry screen (step 45), the PC 100 transmits the entered password to the microcomputer 20 in the liquid crystal projector through the network 52 and the network control circuit 51 (step 46).

The microcomputer 20 judges, when it receives the password sent from the PC 100 (YES in step 25), whether or not the received password coincides with the password already registered (step 26).

When both the passwords coincide with each other, the microcomputer 20 turns the light source lamp 6 on (step 27). The microcomputer 20 notifies the PC 100 that the passwords coincide with each other (step 28). Further, the microcomputer 20 brings the control of the liquid crystal projector by the operation unit 21 or the remote control transmitter 22 into an inhibited state, while bringing the control of the liquid crystal projector by the PC 100 into an allowable state (step 29). That is, although the subsequent key entry made by the operation unit 21 or the remote control transmitter 22 is nullified, a command from the PC 100 is treated as a valid one.

The PC 100 erases, when it receives the notification that the passwords coincide with each other (step 47), the password entry screen, and the liquid crystal projector controlling software then enters a normally started state (step 48).

When the entered password does not coincide with the password already registered, the microcomputer 20 increments a variable k (its initial value is zero) for storing the number of times of entry of an erroneous password by one (step 30). It is judged whether or not the variable k exceeds an allowable number of times K0 previously determined (step 31). When the variable k is not more than the allowable number of times K0 previously determined, the microcomputer 20 notifies the PC 100 of a command to reenter a password (step 34).

The PC 100 displays, when it receives from the microcomputer 20 the command to reenter a password (step 49) a message "Please reenter a password because the password entered last time is erroneous" on the password entry screen currently displayed (step 50). The procedure then proceeds to the step 45.

When it is judged in the foregoing step 31 that the variable k exceeds the allowable number of times K0 previously determined, the microcomputer 20 notifies the PC 100 that the password cannot be used because it is improper (a password is unusable) (step 32). The microcomputer 20 brings the control by the operation unit 21 or the remote control transmitter 22 into an inhibited state, and also brings the control by the PC 100 into an inhibited state (step 33). That is, the subsequent key entry made by the operation unit 21 or the remote control transmitter 22 and the command from the PC 100 are treated as invalid ones.

When the PC 100 receives the notification that the password is unusable (step 51), it displays a warning indicating "the password cannot be used because it does not coincide with the registered password" (step 52). In this case, the liquid crystal projector controlling software is not brought into a normally started state.

In a case where the password is set, it is also possible to change the password and release the setting of the password after the liquid crystal projector controlling software is brought into a normally started state by operating the PC 100. When the setting of the password is released in a state where the password is set, the key operation performed by the operation unit 21 or the remote control transmitter 22 is made valid at the next time when the power to the liquid crystal projector is turned on.

According to the above-mentioned second embodiment, when the password is set in the liquid crystal projector, the liquid crystal projector cannot be controlled (operated) unless a normal password is entered in the PC 100 for controlling the liquid crystal projector after the power to the liquid crystal projector is turned on, thereby preventing improper use.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A liquid crystal projector system for regulating use of a liquid crystal projector, comprising:
    an external computer for operating the liquid crystal projector, the external computer being connected to the liquid crystal projector by radio or wire and including liquid crystal projector controlling software for controlling the liquid crystal projector;
    the liquid crystal projector comprising
        operation means for operating the liquid crystal projector, the operation means including means for entering a command to control the liquid crystal projector via key entry;
        means for registering a password in the liquid crystal projector;
        means for determining whether a password is registered in the liquid crystal projector in response to a power supply of the liquid crystal projector being turned on;
        means for inhibiting operation of the liquid crystal projector by the operation means, as well as for waiting until a password is received from the external computer in response to detecting that the password is registered in the liquid crystal projector;
        means for comparing, in response to receiving the password from the external computer, the received password with the registered password and for allowing operation of the liquid crystal projector by the external computer and nullifying operation of keys of the operation means in response to the means for comparing indicating that both the registered password and the password received from the external computer coincide with each other; and
        means for determining a number of times an erroneous password is entered and inhibiting operation of the liquid crystal projector, except a power-off operation of the liquid crystal projector, by nullifying operation of keys of the operation means, except operation of a power key provided in the operation means, in response to determining that the number of times an erroneous password is entered exceeds a predetermined number of times.

2. A liquid crystal projector system for regulating use of a liquid crystal projector, comprising:
    an external computer for operating the liquid crystal projector, the external computer being connected to the liquid crystal projector by radio or wire and including liquid crystal projector controlling software for controlling the liquid crystal projector;

the liquid crystal projector comprising:

an operation unit for operating the liquid crystal projector, the operation unit including a command entry unit to enter a command control the liquid crystal projector via key entry;

a circuit for previously registering a password in the liquid crystal projector;

a determining unit to determine whether a password is registered in the liquid crystal projector in response to a power supply of the liquid crystal projector being turned on;

a circuit for inhibiting operation of the liquid crystal projector by the operation unit, as well as for waiting until a password is received from the external computer in response to detecting that the password is registered in the liquid crystal projector;

a circuit for comparing, in response to receiving the password from the external computer, the received password with the registered password and for allowing operation of the liquid crystal projector by the external computer and nullifying operation of keys of the operation unit in response to the circuit for comparing indicating that the registered password and the password received from the external computer coincide with each other; and a determining circuit to determine a number of times an erroneous password is entered and to inhibit operation of the liquid crystal projector, except a power-off operation of the liquid crystal projector, by nullifying operation of keys of the operation unit, except operation of a power key provided in the operation unit, in response to determining that the number of times an erroneous password is entered exceeds a predetermined number of times.

* * * * *